United States Patent
Kobata et al.

(10) Patent No.: US 11,597,423 B2
(45) Date of Patent: Mar. 7, 2023

(54) STEERING APPARATUS

(71) Applicant: HONDA MOTOR CO., LTD., Tokyo (JP)

(72) Inventors: Seiji Kobata, Wako (JP); Yuya Obayashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 325 days.

(21) Appl. No.: 16/829,146

(22) Filed: Mar. 25, 2020

(65) Prior Publication Data

US 2020/0331512 A1    Oct. 22, 2020

(30) Foreign Application Priority Data

Apr. 18, 2019    (JP) .............................. JP2019-079050

(51) Int. Cl.
| | |
|---|---|
| *B62D 1/06* | (2006.01) |
| *B62D 1/16* | (2006.01) |
| *B62D 15/02* | (2006.01) |
| *B60K 35/00* | (2006.01) |
| *B62D 5/04* | (2006.01) |
| *B62D 3/02* | (2006.01) |

(52) U.S. Cl.
CPC ................ *B62D 1/06* (2013.01); *B60K 35/00* (2013.01); *B62D 1/16* (2013.01); *B62D 3/02* (2013.01); *B62D 5/046* (2013.01); *B62D 15/0215* (2013.01); *B60K 2370/782* (2019.05)

(58) Field of Classification Search
CPC ... B62D 1/06; B62D 1/16; B62D 3/02; B62D 5/046; B62D 15/0215; B60K 35/00
See application file for complete search history.

(56) References Cited

U.S. PATENT DOCUMENTS

| | | | |
|---|---|---|---|
| 3,248,965 A | 5/1966 | Floria | |
| 7,278,367 B1 * | 10/2007 | Gonring | ................. F02D 11/10 |
| | | | 200/61.57 |

(Continued)

FOREIGN PATENT DOCUMENTS

| | | |
|---|---|---|
| CN | 2794967 | 7/2006 |
| CN | 207609056 U | 7/2018 |

(Continued)

OTHER PUBLICATIONS

Chinese Office Action for Chinese Patent Application No. 202010241507.1 dated Mar. 2, 2022.

(Continued)

*Primary Examiner* — Peter D Nolan
*Assistant Examiner* — Wae L Louie
(74) *Attorney, Agent, or Firm* — Amin, Turocy & Watson, LLP

(57) ABSTRACT

A steering apparatus includes a steering wheel, a support frame, a frame fixation part, and a steering transmission part. The support frame rotatably supports the steering wheel. The frame fixation part fixes the support frame to a vehicle body. The steering transmission part transmits a rotation of the steering wheel relative to the support frame to a steering mechanism of a wheel. The support frame and the frame fixation part are arranged at a position that does not overlap with a rotation center axis line of the steering wheel in a front view of the steering wheel.

8 Claims, 15 Drawing Sheets

(56) References Cited

U.S. PATENT DOCUMENTS

| | | | | |
|---|---|---|---|---|
| 2004/0099468 A1* | 5/2004 | Chernoff | ............... | B62D 1/06 |
| | | | | 180/409 |
| 2010/0175499 A1* | 7/2010 | Thomas | ............... | B62D 1/04 |
| | | | | 74/552 |
| 2014/0365076 A1* | 12/2014 | Cash | ............... | B62D 1/02 |
| | | | | 701/41 |
| 2017/0001658 A1* | 1/2017 | Takagi | ............... | B62D 5/0409 |
| 2020/0331417 A1* | 10/2020 | Kobata | ............... | B60R 21/203 |
| 2020/0331512 A1* | 10/2020 | Kobata | ............... | B62D 1/16 |

FOREIGN PATENT DOCUMENTS

| | | |
|---|---|---|
| CN | 109204433 | 1/2019 |
| DE | 2919284 | 11/1980 |
| JP | 58-170660 | 10/1983 |
| JP | 60-105560 | 7/1985 |
| JP | 05-139319 | 6/1993 |
| JP | 2001-055149 | 2/2001 |
| JP | 2013-043494 | 3/2013 |
| JP | 2013-116677 | 6/2013 |

OTHER PUBLICATIONS

Japanese Office Action for Japanese Patent Application No. 2019-079050 dated Mar. 15, 2022.
Chinese Office Action for Chinese Patent Application No. 202010241507.1 dated Sep. 26, 2022.

* cited by examiner

STEERING APPARATUS

CROSS-REFERENCE TO RELATED APPLICATION

Priority is claimed on Japanese Patent Application No. 2019-079050, filed on Apr. 18, 2019, the contents of which are incorporated herein by reference.

BACKGROUND

Field of the Invention

The present invention relates to a steering apparatus in use for steering a vehicle.

Background

In a steering apparatus of a vehicle, a steering wheel is attached to a steering shaft that protrudes from a frontward direction of a driver's seat toward an upper rear portion of the vehicle. A lower end side of the steering shaft is connected to a steering mechanism of a front wheel at a front lower side of the driver's seat. The steering wheel includes a boss part connected to a front end part of the steering shaft, a rim part gripped by a driver, and a plurality of spoke parts connecting the boss part to the rim part. The boss part is arranged at a rotation center position (on a rotation center axis line) of the rim part having an annular shape. An airbag module that also serves as a horn switch is attached to a surface of the boss part facing the driver's seat side (for example, refer to Japanese Unexamined Patent Application, First Publication No. H5-139319).

SUMMARY

However, in the steering apparatus of the related art, the boss part is arranged on the rotation center axis line of the steering wheel, and the boss part is connected to the steering shaft that also serves as a support part of the steering wheel. Therefore, a view from a middle area on an inner circumferential side of the steering wheel toward an instrument panel direction is blocked by the boss part, the airbag unit, and the like.

An aspect of the present invention provides a steering apparatus capable of providing a good view of an inner circumferential side of a steering wheel toward an instrument panel direction.

A steering apparatus according to an aspect of the present invention includes: a steering wheel that has a substantially annular shape and that is operated and rotated by a driver; a support frame that rotatably supports the steering wheel; a frame fixation part that fixes the support frame to a vehicle body; and a steering transmission part that transmits a rotation of the steering wheel relative to the support frame to a steering mechanism of a wheel, wherein the support frame and the frame fixation part are arranged at a position that does not overlap with a rotation center axis line of the steering wheel in a front view of the steering wheel.

According to the above configuration, when the steering wheel is operated and rotated, the steering wheel is rotated relative to the support frame in a state of being supported by the support frame. When the steering wheel is rotated, the rotation of the steering wheel is transmitted to the steering mechanism of the wheel through the steering transmission part. Since the frame fixation part and the support frame that supports the steering wheel having a substantially annular shape are arranged at a position that does not overlap with the rotation center axis line of the steering wheel in a front view of the steering wheel, a space part that does not block a view toward an instrument panel direction is ensured in a middle area on an inner circumferential side of the steering wheel.

An area that includes a part, through which the rotation center axis line of the steering wheel passes, on an inner circumferential side of the steering wheel may be an access area through which an instrument panel of a vehicle is visible and operable.

In this case, it becomes possible to easily perform an operation and visual recognition with respect to the instrument panel through the access area on the inner circumferential side of the steering wheel.

The steering transmission part may be constituted of a mechanical operation transmission mechanism arranged at a position that is offset from the rotation center axis line of the steering wheel.

In this case, it becomes possible to reliably transmit an operation of the steering wheel to the steering mechanism of the wheel by the mechanical operation transmission mechanism. Further, the operation transmission mechanism is arranged at a position that is offset from the rotation center axis line of the steering wheel and therefore does not significantly block the view of the inner circumferential side of the steering wheel toward the instrument panel direction.

The operation transmission mechanism may include a ring gear that is rotated integrally with the steering wheel and a power transmission gear that is rotatably supported by the support frame and that is engaged with a tooth surface of the ring gear and transmits a rotation of the ring gear to the steering mechanism.

In this case, when the steering wheel is operated and rotated, the ring gear is rotated integrally with the steering wheel. When the ring gear is rotated in this way, the rotation of the ring gear is transmitted to the steering mechanism through the power transmission gear that is engaged with the ring gear. In this case, it is possible to transmit the rotation of the steering wheel to the steering mechanism by a simple configuration.

The steering transmission part may include a steering detection part that detects rotation information of the steering wheel relative to the support frame and a steering actuator that operates the steering mechanism according to the information detected by the steering detection part.

In this case, it is possible to transmit the rotation of the steering wheel to the steering mechanism without using a mechanical mechanism. Therefore, the degree of freedom of the arrangement of configuration components is enhanced, and there is an advantage from the viewpoint of a component layout of the vehicle.

The steering apparatus may further include a cover material that covers around a grip part of the steering wheel, wherein the support frame may have a protrusion part that protrudes toward an inner circumferential side from the steering wheel, an opening part that accepts displacement of the protrusion part accompanied by a rotation operation of the steering wheel may be formed on the cover material, and a lid part capable of closing the opening part may be provided on an edge portion of the opening part.

In this case, when the protrusion part is moved relative to the cover material by the rotation operation of the steering wheel, the lid part opens the opening part and accepts the displacement of the protrusion part. In a situation where the protrusion part does not pass through the opening part, the lid part closes the opening part of the cover material and prevents deterioration of appearance.

The lid part may be biased by a biasing member in a direction in which the opening part is closed.

In this case, in a situation where the protrusion part does not pass through the opening part of the cover material, the lid part is biased by the biasing member and reliably closes the opening part.

The steering wheel may include a main wheel gripped by the driver and a supplement wheel that is arranged on an inner circumferential side of the main wheel, is rotated integrally with the main wheel, and is rotatably supported by the support frame.

In this case, since the supplement wheel that is not gripped by the driver at an ordinary time is rotatably supported by the support frame, for example, even if the support frame includes a protrusion part that protrudes toward an inner circumferential side from the supplement wheel, a finger of the driver who grips the main wheel does not come into contact with the protrusion part. Accordingly, when the present configuration is adopted, the rotation operation of the driver who grips the steering wheel becomes easy.

An instrument may be provided on a surface that faces a driver's seat side of the steering wheel.

In this case, it becomes possible for the driver who grips the steering to read a display of the instrument at a position close to the eyes of the driver.

According to the aspect of the present invention, the frame fixation part and the support frame that supports the steering wheel having a substantially annular shape are arranged at a position that does not overlap with the rotation center axis line of the steering wheel in a front view of the steering wheel. Therefore, when the steering apparatus according to the aspect of the present invention is adopted, a space part that does not block a view toward the instrument panel direction is ensured at the inner circumferential side of the steering wheel, and the view toward the instrument panel direction is improved.

DESCRIPTION OF EMBODIMENTS

Figure 1:
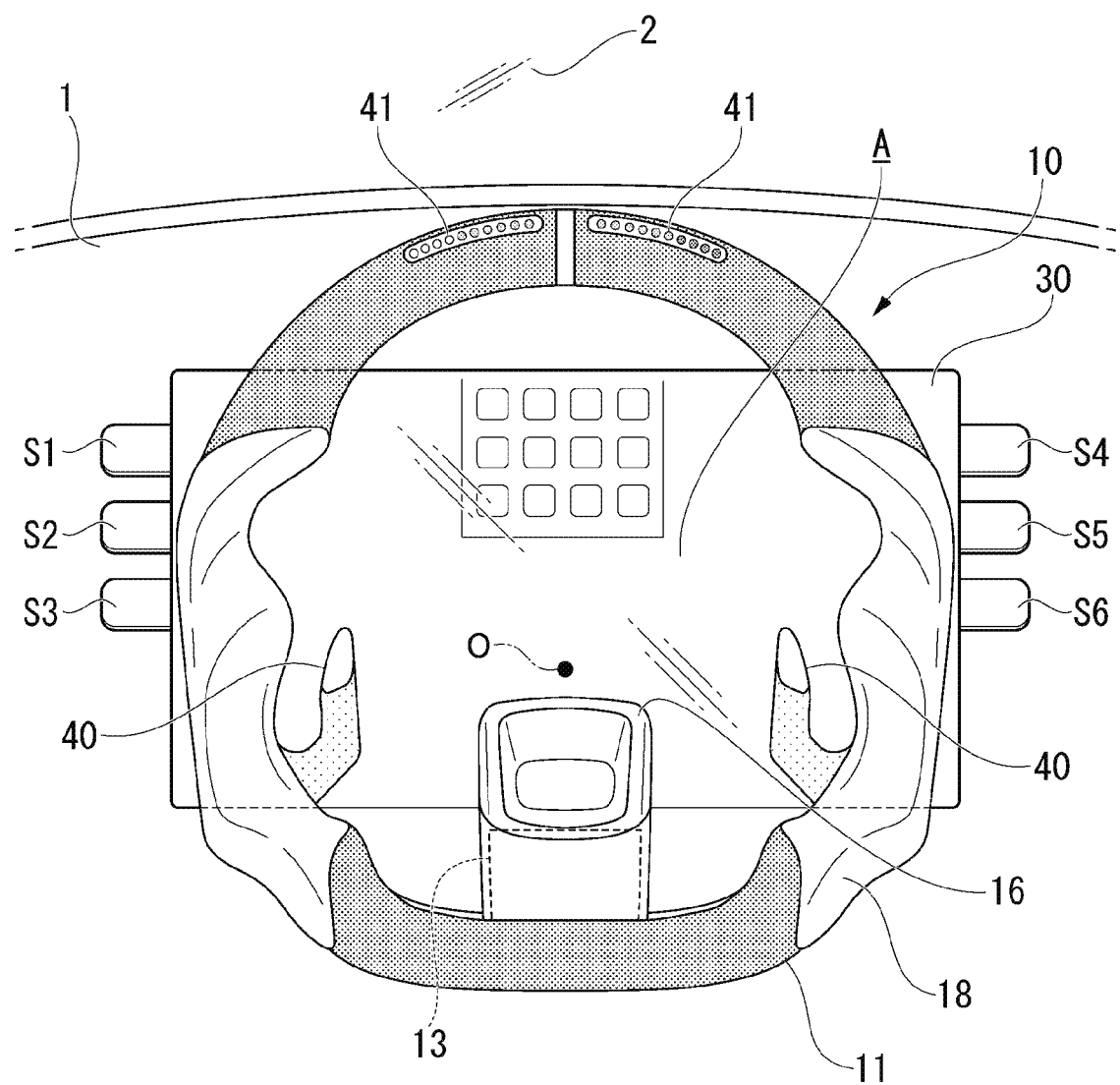
FIG. 1 is a front view of a steering apparatus according to a first embodiment when seen from a driver's seat side.

Hereinafter, embodiments of the present invention will be described with reference to the drawings. In the embodiments described below, common parts are denoted by the same reference numerals, and redundant descriptions are omitted.

First Embodiment

First, a first embodiment shown in FIG. 1 to FIG. 9 will be described.

Figure 2:
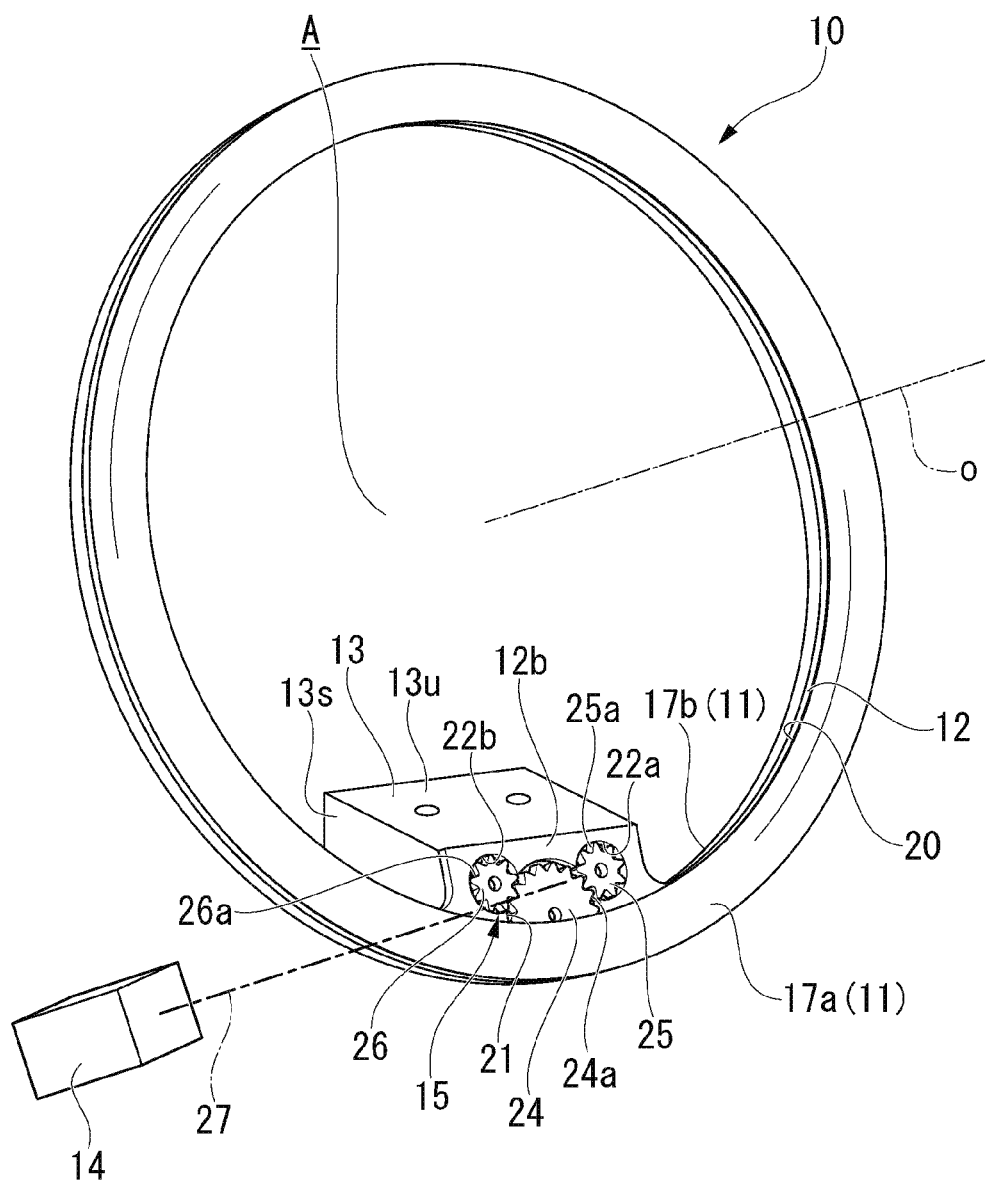
FIG. 2 is a perspective view of a main part of the steering apparatus according to the first embodiment.
Figure 3:
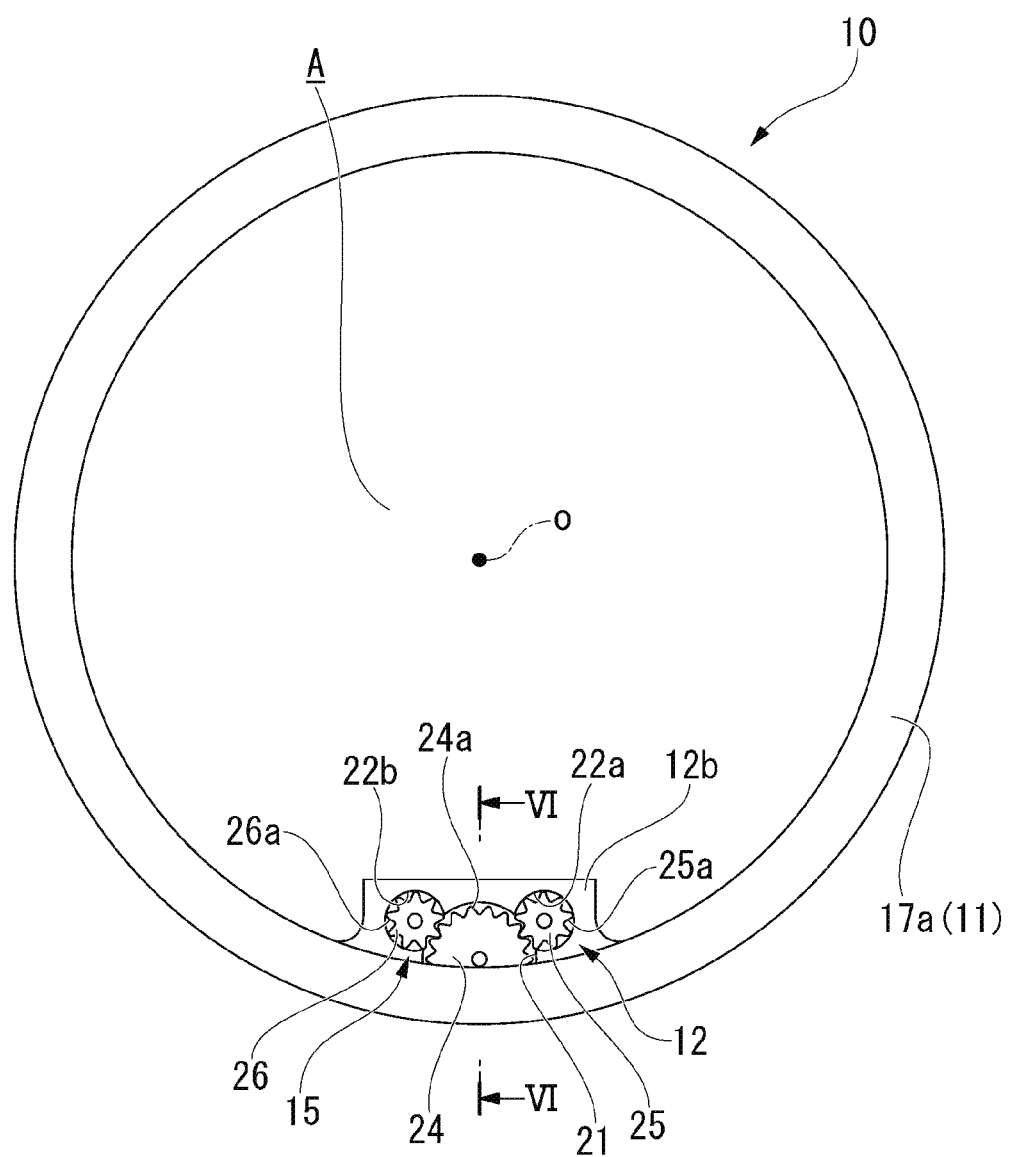
FIG. 3 is a front view of the main part of the steering apparatus according to the first embodiment.
Figure 4:
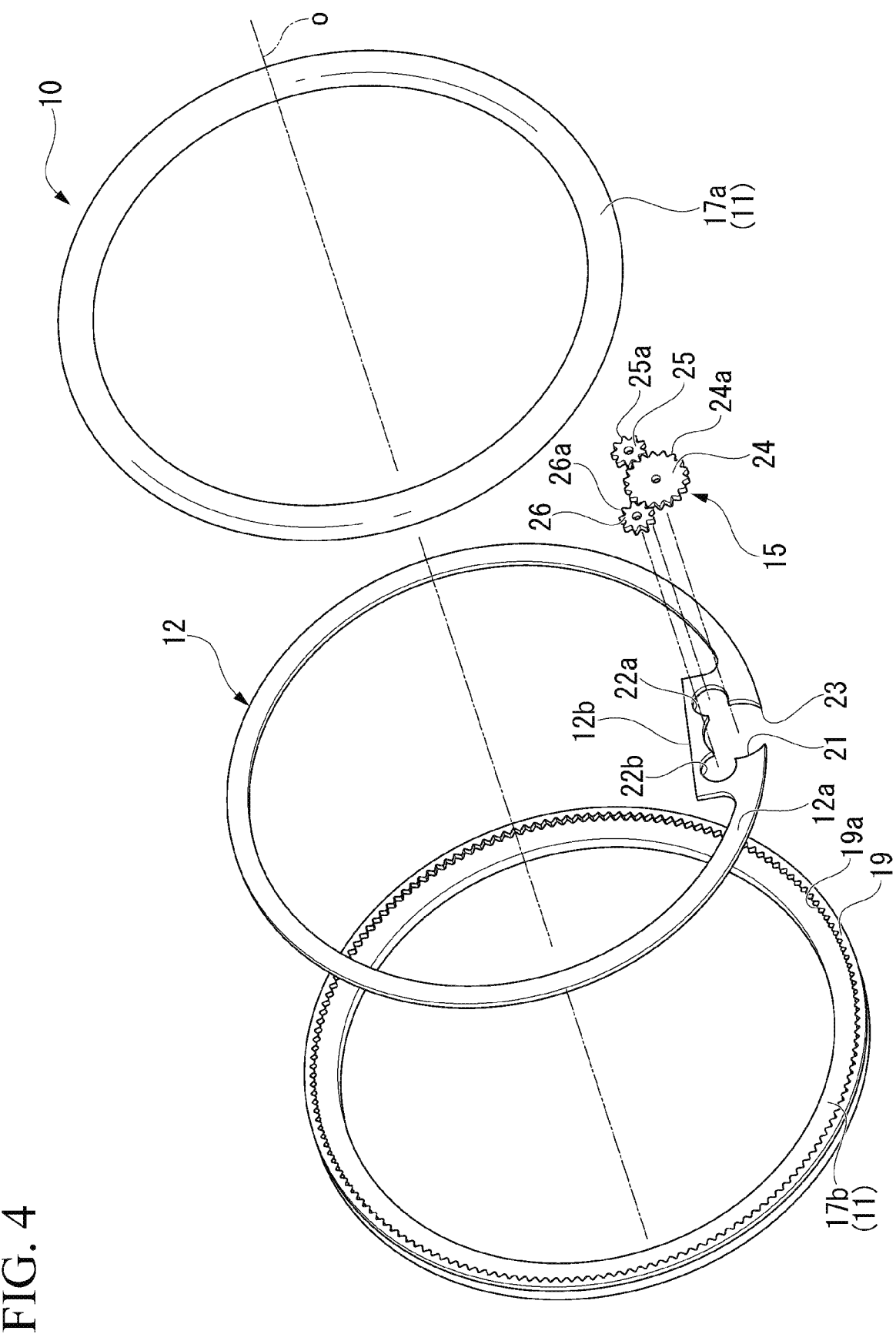
FIG. 4 is an exploded perspective view of the main part of the steering apparatus according to the first embodiment.

FIG. 1 is a view showing a front of a driver's seat of a vehicle employing a steering apparatus 10 of the first embodiment. FIG. 2 is a perspective view of a main part of the steering apparatus 10. FIG. 3 is a front view of the main part of the steering apparatus 10. FIG. 4 is an exploded perspective view of the main part of the steering apparatus 10. In FIG. 1, reference numeral 1 indicates an instrument panel in front of the driver's seat, and reference numeral 2 indicates a front windshield in front of the driver's seat.

The steering apparatus 10 includes: a steering wheel 11 that has a substantially annular shape and that is operated and rotated by a driver; a support frame 12 that rotatably supports the steering wheel 11; a fixation stay 13 (refer to FIG. 2) that fixes the support frame 12 to a frame member of a vehicle body (not shown); and an operation transmission mechanism 15 (steering transmission part) that transmits a rotation of the steering wheel 11 to a steering mechanism 14; and an airbag unit 16 that inflates and expands a bag body (not shown) upon input of an impact.

Figure 5:
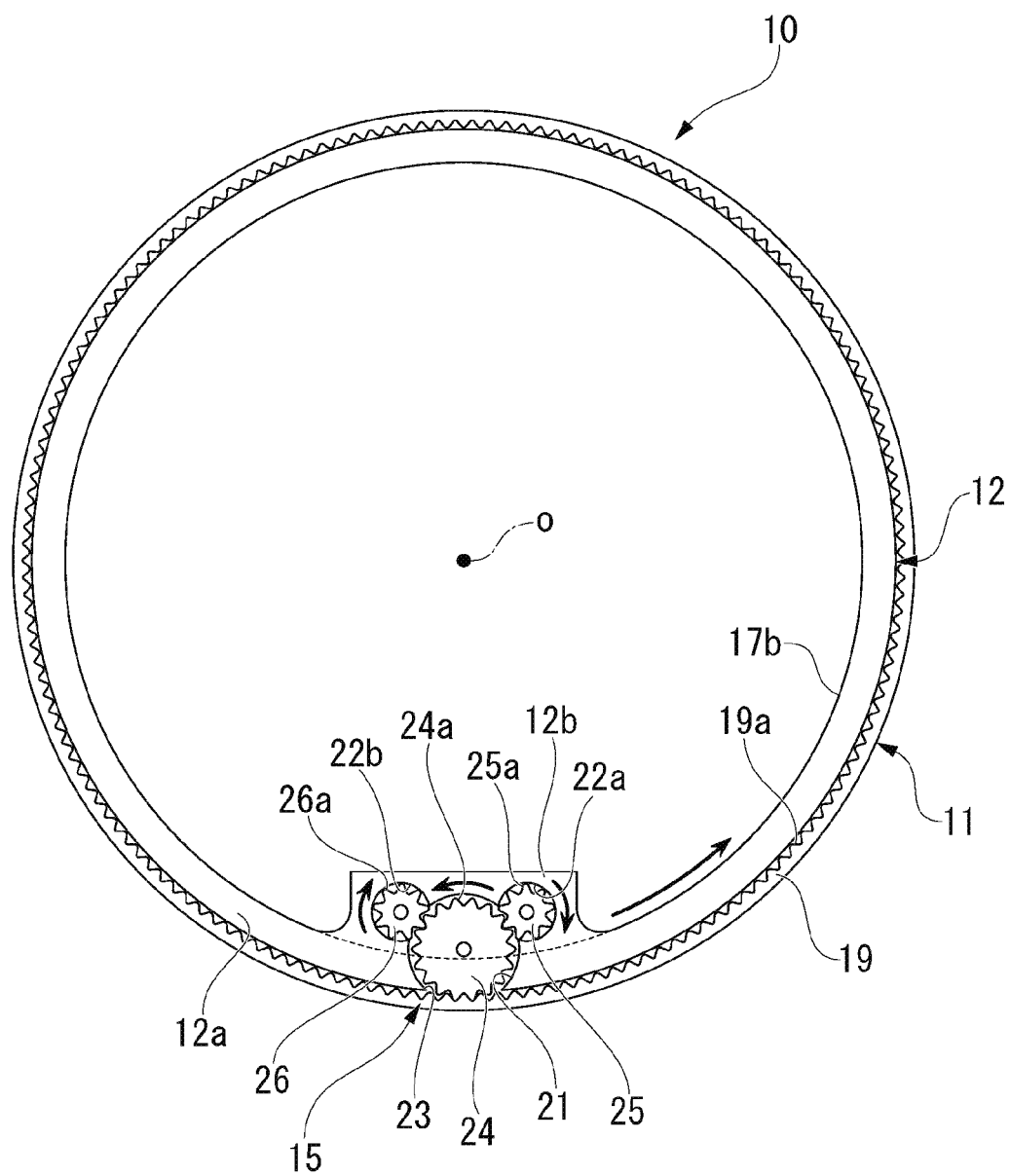
FIG. 5 is a view showing an operation of the main part of the steering apparatus according to the first embodiment.
Figure 6:
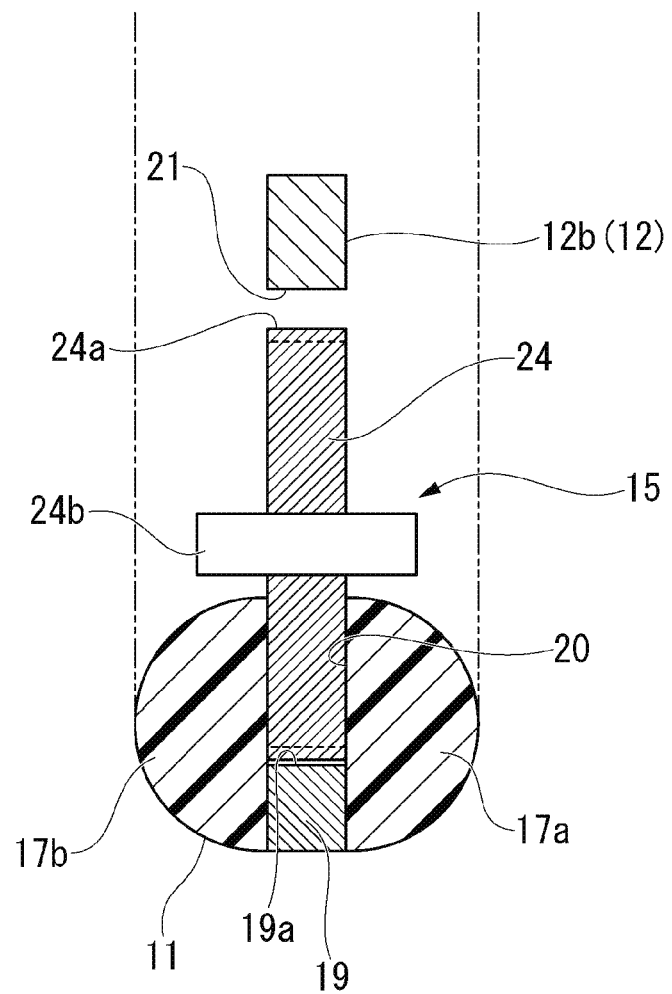
FIG. 6 is a cross-sectional view along a VI-VI line of FIG. 3 of the steering apparatus according to the first embodiment.

FIG. 5 is a view showing an operation of the main part of the steering apparatus 10. In FIG. 5, part of components (a wheel half body 17*a* which will be described later) is removed from the front view of the main part of FIG. 3. FIG. 6 is a cross-sectional view along a VI-VI line of FIG. 3. The scale of the cross-section of FIG. 3 is appropriately adjusted.

As shown in FIG. 2 to FIG. 6, the steering wheel 11 is obtained by joining two wheel half bodies 17*a*, 17*b* having a substantially annular shape together, and a circumference of the two wheel half bodies 17*a*, 17*b* joined together is covered by a cover material 18 (refer to FIG. 1 and FIG. 7 to FIG. 9). A ring gear 19 having an inner circumferential surface on which an internal tooth 19*a* is formed is sandwiched and fixed between the two wheel half bodies 17*a*, 17*b*. An outer diameter of the ring gear 19 is formed to be substantially the same as a maximum outer diameter of the two wheel half bodies 17*a*, 17*b*. An inner diameter of the ring gear 19 is set to be larger than a minimum inner diameter of the two wheel half bodies 17*a*, 17*b*. An opening part 20 that opens radially inward is formed in an annular shape between the ring gear 19 and the two wheel half bodies 17a, 17b.

A pair of paddle levers 40 by which the driver can perform an operation of changing the speed of the vehicle in a state of gripping the steering wheel 11 is attached to the steering wheel 11 (not shown in the drawings other than FIG. 1). An instrument 41 such as a tachometer is attached to a surface of the steering wheel 11 facing the driver's seat side. The instrument 41 is arranged in a region which is positioned at an upper side when the steering wheel 11 is at a neutral position.

The support frame 12 is formed of a plate material (metal plate) having a substantially annular shape. The support frame 12 includes a ring part 12a having a substantially annular shape and a protrusion piece 12b (protrusion part) having a substantially rectangular shape and protruding radially inward from an inner circumferential edge portion of the ring part 12a. A first gear accommodation hole 21 having a large diameter is formed in a region spanning the ring part 12a and the protrusion piece 12b. A second gear accommodation hole 22a having a small diameter and a third gear accommodation hole 22b having a small diameter are formed at two positions adjacent to the first gear accommodation hole 21 of the protrusion piece 12b. The second gear accommodation hole 22a and the third gear accommodation hole 22b communicate with the first gear accommodation hole 21. A cutout part 23 through which part of the first gear accommodation hole 21 opens to an outer circumferential side of the ring part 12a is provided in an area of an outer circumferential surface of the ring part 12a on which the protrusion piece 12b is provided. The cutout part 23 opens, by a predetermined width, part of the first gear accommodation hole 21 along a circumferential direction of the ring part 12a.

A first gear 24 having a large diameter is rotatably accommodated in the first gear accommodation hole 21. The first gear 24 includes an outer tooth 24a on an outer circumferential surface of the first gear 24. The outer tooth 24a of the first gear 24 is exposed to an outer circumferential side of the ring part 12a through the cutout part 23 of the ring part 12a. As shown in FIG. 6, the first gear 24 has a rotation shaft 24b, and the rotation shaft 24b is rotatably supported by the protrusion piece 12b via a shaft support part (not shown).

The ring part 12a of the support frame 12 is slidably accommodated in the opening part 20 on the inner circumferential side of the steering wheel 11. The ring part 12a rotatably supports the steering wheel 11 around a rotation center axis line o which is an axis center of the ring part 12a. The steering wheel 11 is supported coaxially with the ring part 12a. The outer tooth 24a of the first gear 24 exposed outside from the cutout part 23 of the ring part 12a is engaged with the inner tooth 19a of the ring gear 19 within the opening part 20 of the steering wheel 11. Therefore, when the steering wheel 11 is operated and rotated by the driver, the rotation of the steering wheel 11 is transmitted to the first gear 24 via the ring gear 19.

A second gear 25 having a small diameter is rotatably accommodated in the second gear accommodation hole 22a. A third gear 26 having a small diameter is rotatably accommodated in the third gear accommodation hole 22b. The second gear 25 has an outer tooth 25a, and the outer tooth 25a is engaged with the outer tooth 24a of the first gear 24. The third gear 26 has an outer tooth 26a, and the outer tooth 26a is engaged with the outer tooth 24a of the first gear 24.

In the present embodiment, the output shaft 27 is integrally rotatably connected to the second gear 25.

The output shaft 27 penetrates through the instrument panel 1 and is connected to the steering mechanism 14 provided on a front lower part of the vehicle such that power is transmittable to the steering mechanism 14. Accordingly, a rotation operation force applied to the steering wheel 11 is transmitted from the ring gear 19 to the steering mechanism 14 via the first gear 24, the second gear 25, and the output shaft 27. The steering mechanism 14 steers a front wheel of the vehicle in response to a rotation force and a rotation direction of the steering wheel 11.

The third gear 26 is a gear for balancing and can be omitted. In the present embodiment, the first gear 24, the second gear 25, and the output shaft 27 constitute the mechanical operation transmission mechanism 15 (steering transmission part). The first gear 24 and the second gear 25 constitute a power transmission gear that transmits the rotation of the ring gear 19 to the steering mechanism 14.

As shown in FIG. 2, the fixation stay 13 is formed in a substantially U shape in a cross-section that includes a flat upper wall 13u and a side wall 13s extending downward from right and left end parts of the upper wall 13u, and the cross-section extends substantially parallel to the rotation center axis line o of the steering wheel 11. The cross-sectional shape of the fixation stay 13 is not limited to the substantially U shape. One end part of an extension direction of the fixation stay 13 is fixed to the frame member of the vehicle body (not shown). Another end part of the extension direction of the fixation stay 13 is integrally joined to the protrusion piece 12b of the support frame 12. In the present embodiment, the fixation stay 13 constitutes a frame fixation part that fixes the support frame 12 to the vehicle body.

In the present embodiment, the fixation stay 13 (frame fixation part) and the support frame 12 are constituted of separate components; however, the fixation stay 13 (frame fixation part) and the support frame 12 can be constituted of an integral component.

The fixation stay 13 and the protrusion piece 12b of the support frame 12 joined to the fixation stay 13 are arranged at a position that is offset downward by a predetermined amount from the rotation center axis line o of the steering wheel 11. The ring part 12a of the support frame 12 is arranged on an inner side of the opening part 20 on an inner circumferential side of the steering wheel 11. Accordingly, the fixation stay 13 and the support frame 12 (the protrusion piece 12b and the ring part 12a) are arranged at a position that does not overlap with the rotation center axis line o of the steering wheel 11 in a front view of the steering wheel 11.

The airbag unit 16 shown in FIG. 1 is attached to the upper wall 13u of the fixation stay 13. The airbag unit 16 is attached to the fixation stay 13 in a state of accepting a stroke of a predetermined amount in a vertical direction. The airbag unit 16 also serves as a horn operation part of a horn for warning. That is, a horn contact point that turns on an energizing circuit of the horn when the airbag unit 16 is operated to be pushed down is attached to the airbag unit 16. The airbag unit 16 attached to the fixation stay 13 is positioned in an area (an area that is offset downward by a predetermined amount relative to the rotation center axis line o) that does not overlap with the rotation center axis line o of the steering wheel 11 in the front view of the steering wheel 11.

In the steering apparatus 10 of the present embodiment, the fixation stay 13, the airbag unit 16, the support frame 12, and the like are not arranged in a middle area that includes the rotation center axis line o on an inner circumferential side of the steering wheel 11, and a large space part that does not block a view of the driver in the instrument panel 1 direction is ensured. The space part is defined as an access area A through which the instrument panel 1 is visible and operable.

In the case of the present embodiment, as shown in FIG. 1, a display panel 30 such as a liquid crystal panel which can be operated by a touch operation is arranged at a front position of the driver's seat of the instrument panel 1. The display panel 30 is adapted to appropriately switch among a display of a current driving situation such as a vehicle speed, a display of a navigation screen, and another information display by operating a selector switch (not shown). The screen of the display panel 30 can be viewed through the large access area A on the inner side of the steering wheel 11. The touch operation or the like on the display panel 30 can also be performed through the large access area A on the inner circumferential side of the steering wheel 11.

Further, in the steering apparatus 10 of the present embodiment, since a steering shaft, a steering column, or the like is not present on the rotation center axis line o of the steering wheel 11, various switches S1 to S6 such as a winker switch and a wiper switch which are generally provided on the steering column or the like are provided at a front position of the instrument panel 1 as shown in FIG. 1.

Figure 7:
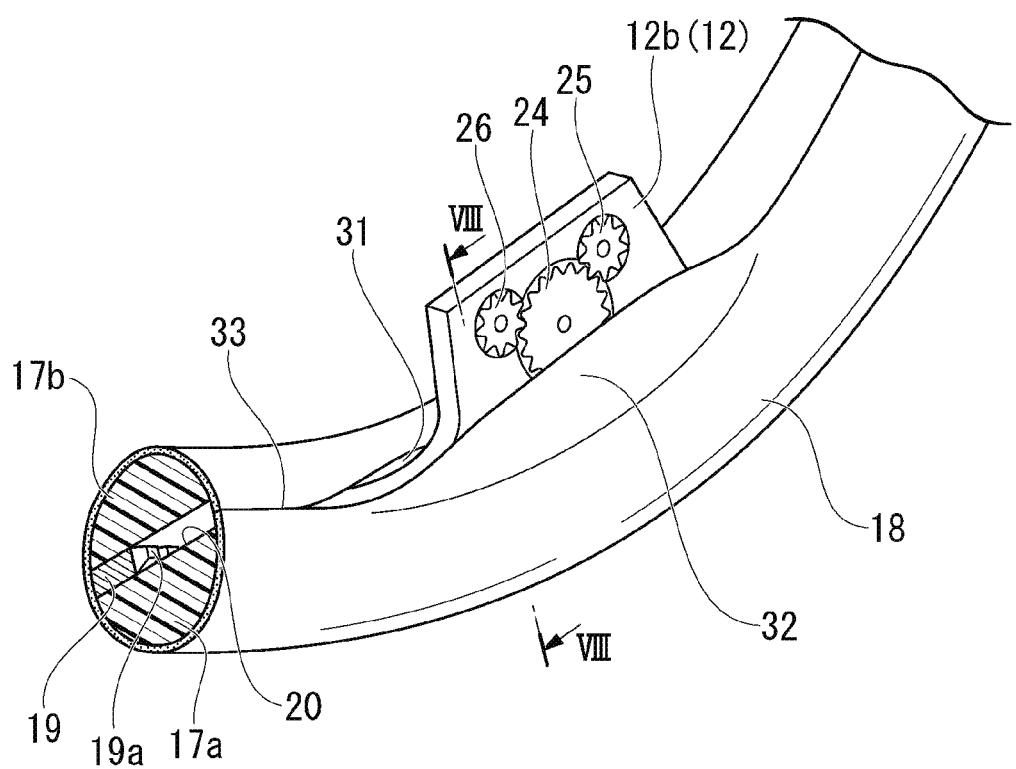
FIG. 7 is a partial cross-sectional perspective view of the steering apparatus according to the first embodiment.
Figure 8:
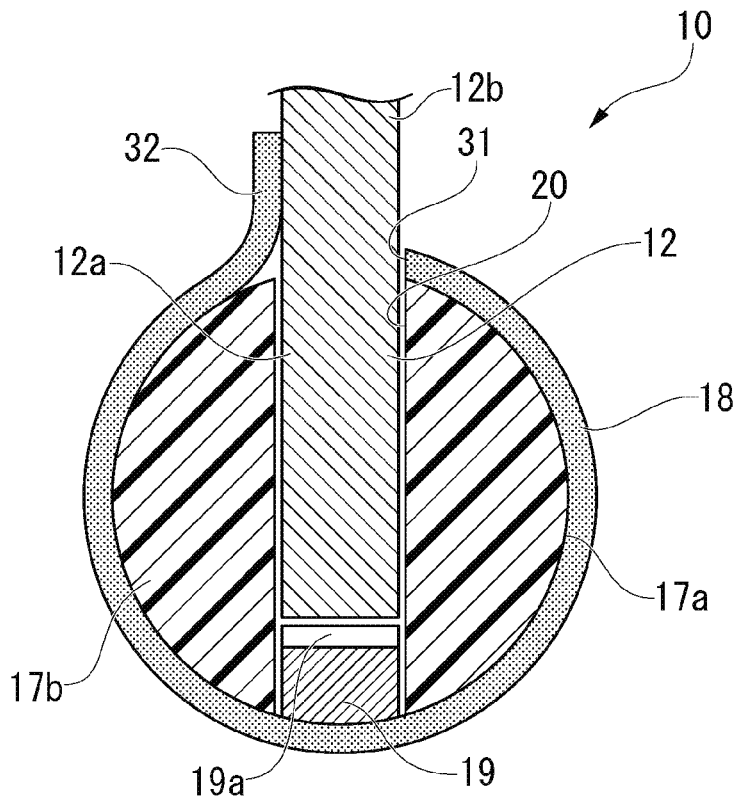
FIG. 8 is a cross-sectional view along a VIII-VIII line of FIG. 7 of the steering apparatus according to the first embodiment.

FIG. 7 is a partial cross-sectional perspective view showing a cross-section of part of the steering wheel 11. FIG. 8 is a cross-sectional view along a VIII-VIII line of FIG. 7. FIG. 7 and FIG. 8 show a state where the cover material 18 is attached to a circumferential region of the steering wheel 11.

An opening part 31 that extends along a circumferential direction of the steering wheel 11 is formed on a part of the cover material 18 corresponding to an inner circumferential part (a radially inside part) of the steering wheel 11. A lid part 32 that is capable of closing the opening part 31 is integrally formed on one side edge portion of the opening part 31.

In the present embodiment, an incision 33 is formed on an inner circumferential part of the cover material 18, and a side edge part of the cover material 18 corresponding to the opening part 20 on the inner circumferential side of the steering wheel 11 is deformable in a deflection manner (capable of being lifted up) as a lid part 32. That is, one side edge part of the cover material 18 adjacent to the incision 33 serves as the lid part 32, and the opening part 31 of the cover material 18 appears in a state where the side edge part (the lid part 32) is lifted up. In the present embodiment, the cover material 18 is formed of a material having elasticity, and when an external force is applied from the inside to the one side edge part (the lid part 32) of the incision 33, the side edge part is lifted up such that the opening part 31 is pushed and opened. The one side edge part (the lid part 32) of the incision 33 closes the opening part 31 in a state where the external force is not applied. When the steering wheel 11 is operated and rotated from this state, and the one side edge part (the lid part 32) of the incision 33 comes into contact with the protrusion piece 12b of the support frame 12, as shown in FIG. 7 and FIG. 8, the side edge part (the lid part 32) is pushed up from the inside by the protrusion piece 12b and thereby opens the opening part 31. As a result, the protrusion piece 12b can pass through the opening part 31. After the protrusion piece 12b passes through the opening part 31, or when the steering wheel 11 is operated and rotated in a reverse direction, the one side edge part (the lid part 32) of the incision 33 closes the opening part 31 by the elasticity of the one side edge part itself.

Figure 9:
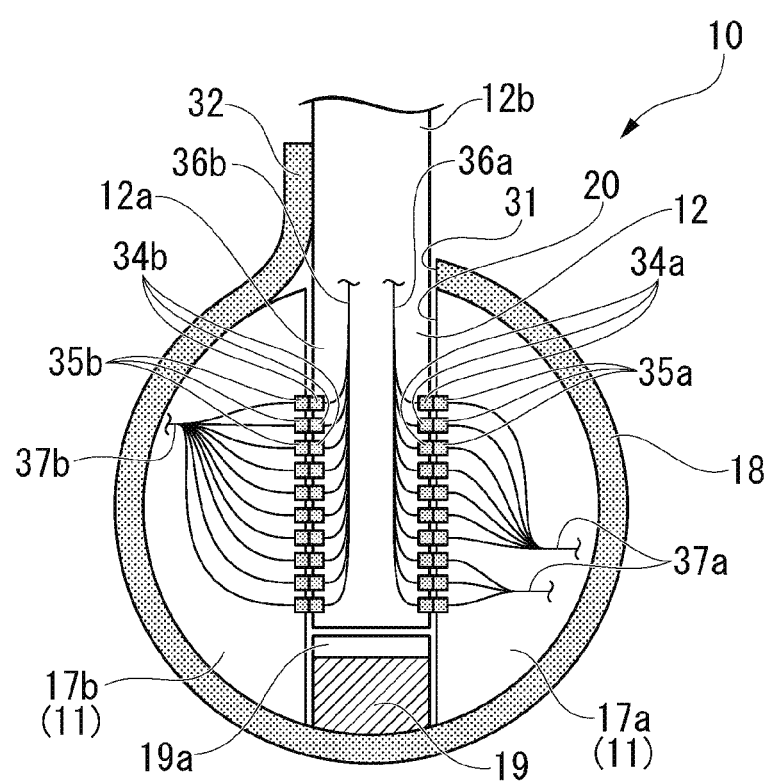
FIG. 9 is a view showing a cross-section of the same part as FIG. 8 of the steering apparatus according to the first embodiment to which an image of an electric wiring is added.

FIG. 9 is a view in which an image of an electric wiring is added to a cross-section of the same part as FIG. 8.

As shown in FIG. 9, a plurality of ring-shaped terminals 34a, 34b are provided on a side surface of the ring part 12a of the support frame 12. On the other hand, connection terminals 35a, 35b which are always in slidable contact with the ring-shaped terminals 34a, 34b are arranged at a position facing the ring-shaped terminals 34a, 34b of the wheel half bodies 17a, 17b of the steering wheel 11. Each of the ring-shaped terminals 34a, 34b of the ring part 12a is connected to a control apparatus and an electric power supply circuit on the vehicle through cables 36a, 36b wired to the fixation stay 13 and the projection 12b of the support frame 12. On the other hand, the connection terminals 35a, 35b of the wheel half bodies 17a, 17b are connected to a signal input/output part and an energized part such as the instrument 41 and the paddle lever 40 arranged on the steering wheel 11 through cables 37a, 37b wired to the wheel half bodies 17a, 17b. In the present embodiment, the above-described configuration enables a signal input/output and electric power supply with respect to the instrument 41, the paddle lever 40, and the like regardless of a rotation operation position of the steering wheel 11.

In the steering apparatus 10 of the configuration described above, when the steering wheel 11 is operated and rotated by the driver, the steering wheel 11 is rotated relative to the support frame 12 in a state of being held by the support frame 12. When the steering wheel 11 is rotated in this way, the rotation of the steering wheel 11 is transmitted to the steering mechanism 14 through the ring gear 19, the first gear 24, the second gear 25, and the output shaft 27 in this order as the steering transmission part.

At this time, the fixation stay 13 (frame fixation part) and the support frame 12 that supports the steering wheel 11 having a substantially annular shape are arranged at a position that does not overlap with the rotation center axis line o of the steering wheel 11 in a front view of the steering wheel 11. According to this configuration, a space part (access area A) that does not block a view in the instrument panel 1 direction is ensured in a middle area on an inner circumferential side of the steering wheel 11. Accordingly, when the steering apparatus 10 of the present embodiment is employed, the view in the instrument panel direction is improved.

Further, in the steering apparatus 10 of the present embodiment, since a large access area A on the inner circumferential side of the steering wheel 11 is ensured, it becomes possible to easily perform visual recognition with respect to the instrument panel 1, a touch operation with respect to the display panel 30, and the like through the large access area A.

Further, in the steering apparatus 10 of the present embodiment, the steering transmission part that transmits the rotation operation of the steering wheel 11 to the steering mechanism 14 is constituted of the mechanical operation transmission mechanism 15, and the operation transmission mechanism 15 is arranged at a position that is offset downward widely from the rotation center axis line o of the steering wheel 11. Therefore, in the steering apparatus 10 of the present embodiment, it becomes possible to reliably transmit the rotation operation of the steering wheel 11 to the steering mechanism 14 of the wheel by the mechanical operation transmission mechanism 15, and furthermore, the operation transmission mechanism 15 does not significantly block the view in the instrument panel 1 direction of the inner circumferential side of the steering wheel 11.

In particular, the operation transmission mechanism 15 of the present embodiment includes the ring gear 19 that is rotated integrally with the steering wheel 11 and the power transmission gear (the first gear 24 and the second gear 25) that is rotatably supported by the support frame 12 and that transmits the rotation of the ring gear 19 to the steering mechanism 14. Accordingly, in a case where the operation transmission mechanism 15 of the present configuration is employed, it is possible to transmit the rotation of the steering wheel 11 to the steering mechanism 14 by a simple configuration.

Further, in the steering apparatus 10 of the present embodiment, the airbag unit 16 that also serves as the horn operation part is attached to the fixation stay 13 at a position that is offset from the rotation center axis line o of the steering wheel 11. Therefore, the horn operation part can be arranged at a position where the horn operation part is easily operated, and the airbag unit 16 does not narrow the access area A on the inner circumferential side of the steering wheel 11.

Further, in the steering apparatus 10 of the present embodiment, the opening part 31 that accepts the displacement of the protrusion piece 12b of the support frame 12 accompanied by the rotation operation of the steering wheel 11 is formed on the cover material 18 that covers around the grip part of the steering wheel 11. The lid part 32 that closes the opening part 31 by the elasticity of the cover material 18 is provided on the edge portion of the opening part 31.

Therefore, when the protrusion piece 12b is moved relative to the cover material 18 by the rotation operation of the steering wheel 11, the lid part 32 opens the opening part 31 and accepts the displacement of the protrusion piece 12b.

Further, in a situation where the protrusion piece 12b does not pass through the opening part 31, the lid part 32 closes the opening part 31 of the cover material 18. Accordingly, when the present configuration is employed, it is possible to prevent the deterioration of the appearance by the opening part 31 of the cover material 18 being seen to be widely opened from the outside.

Further, in the case of the steering apparatus 10 of the present embodiment, since the instrument 41 is provided on the surface that faces the driver's seat side of the steering wheel 11, it becomes possible for the driver who grips the steering wheel 11 to read the display of the instrument 41 at a position close to the eyes of the driver. In particular, in the present embodiment, when the steering wheel 11 is at a neutral position (a position where the front wheel is oriented in a straight direction), the instrument 41 is arranged in an area positioned at the upper end side of the steering wheel 11, and therefore, it becomes easier for the driver to read the display of the instrument 41.

Second Embodiment

Figure 10:
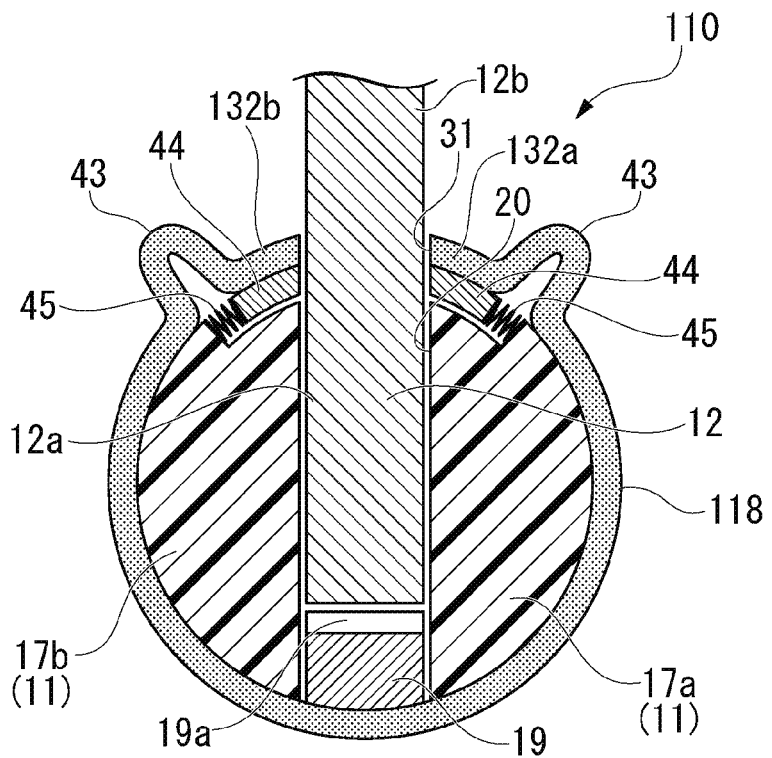
FIG. 10 is a cross-sectional view similar to FIG. 8 of a steering apparatus of a second embodiment.

FIG. 10 is a cross-sectional view similar to FIG. 8 of a steering apparatus 110 of a second embodiment.

In the steering apparatus 110 of the present embodiment, a basic configuration is similar to that of the first embodiment, but the configuration of lid parts 132a, 132b that close the opening part 31 of a cover material 118 is different from that of the first embodiment.

The lid parts 132a, 132b of the cover material 118 is formed on an edge portion on both sides of the opening part 31. The lid parts 132a, 132b are formed integrally with the cover material 118. A deflection acceptance part 43 that accepts displacement (displacement in a direction in which the opening part 31 is opened and closed) of the lid parts 132a, 132b is formed on a root portion of the lid parts 132a, 132b. A movable piece 44 is attached integrally to an inside (an inner circumferential surface side of the cover material 118) of each of the lid parts 132a, 132b (edge portion of the opening part 31). Each movable piece 44 is always biased in the direction in which the opening part 31 is closed by a coil spring 45 which is a biasing member.

In the case of the present embodiment, the lid parts 132a, 132b on both sides receives a biasing force of the coil spring 45 and closes the opening part 31 during no external force is applied from the inside of the opening part 31 of the cover material 118. When the steering wheel 11 is operated and rotated from this state, and the lid parts 132a, 132b come into contact with the protrusion piece 12b of the support frame 12, the lid parts 132a, 132b on both sides and the movable piece 44 are pushed by the protrusion piece 12b. Thereby, while deforming the deflection acceptance part 43, the lid parts 132a, 132b on both sides and the movable piece 44 are displaced against the biasing force of the coil spring 45. As a result, the lid parts 132a, 132b on both sides push and open the opening part 31 such that the protrusion piece 12b can pass through the opening part 31. After the protrusion piece 12b passes through the opening part 31, or when the steering wheel 11 is operated and rotated in a reverse direction, the lid parts 132a, 132b receive the biasing force of the coil spring 45 and close the opening part 31.

In the steering apparatus 110 of the present embodiment, since the lid parts 132a, 132b of the cover material 118 are biased by the coil spring 45 in the direction in which the opening part 31 is closed, it is possible to reliably close the opening part 31 by the lid parts 132a, 132b in a situation where the protrusion piece 12b of the support frame 12 does not pass through the opening part 31. Accordingly, it is possible to further enhance the appearance of the cover material 118.

Third Embodiment

Figure 11:
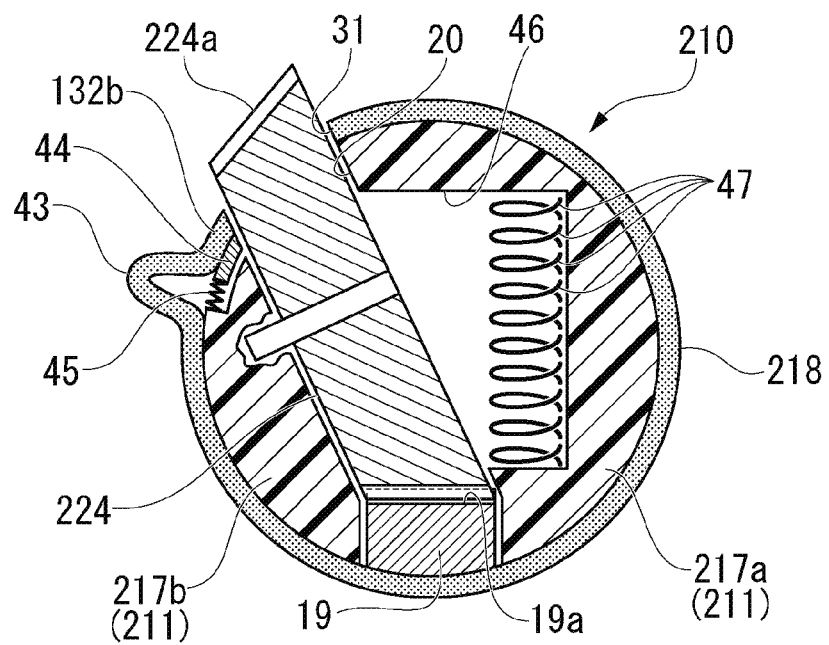
FIG. 11 is a cross-sectional view similar to FIG. 8 of a steering apparatus of a third embodiment.

FIG. 11 is a cross-sectional view similar to FIG. 8 of a steering apparatus 210 of a third embodiment.

In the steering apparatus 210 of the present embodiment, a basic configuration is substantially similar to that of the first and second embodiments, but a wiring structure for energizing an apparatus such as an instrument and a paddle lever on the steering wheel 211 through the support frame is different from that of the first and second embodiments.

An annular groove 46 having a substantially U shape in a cross-section and oriented inward is formed on a wheel half body 217a on one side (driver's seat side) that constitutes the steering wheel 211. The inside of the annular groove 46 is a cable reel that accommodates a plurality of cables 47. Each cable 47 is wired along the annular groove 46 which is the cable reel. One end side of each cable 47 is connected to the apparatus on the steering wheel 211 side. Another end side of each cable 47 is connected to a control apparatus and an electric power supply circuit on the vehicle through the support frame. Each cable 47 has an extra length part that prevents a large tensile force from acting on the cable 47 when the steering wheel 211 is rotated maximally from the neutral position to one side and when the steering wheel 211 is rotated maximally to another side.

Further, in the present embodiment, the opening part 20 formed between the ring gear 19 and the wheel half bodies 217a, 217b at front and rear sides of the steering wheel 211 is formed to be tilted toward a vehicle frontward direction.

Thereby, the cross-section of the wheel half body 217a on the front side is larger, and an annular groove 46 having a large opening area can be formed inside the cross-section of the wheel half body 217a on the front side. A first gear 224 that is engaged with the internal tooth 19a of the ring gear 19 is constituted of a bevel gear. A tooth surface 224a of the first gear 224 which is engaged with the ring gear 19 can be preferably a beveled tooth.

Further, the opening part 31 and a lid part 132b that is capable of closing the opening part 31 are provided on an inner circumferential part of a cover material 218 of the present embodiment. Similarly to the second embodiment, the deflection acceptance part 43 is provided on a base portion side of the lid part 132b, and a movable piece 44 is attached to the inside of the lid part 132b. The movable piece 44 is biased by a coil spring 45 which is a biasing member in a direction in which the opening part 31 is closed.

In the steering apparatus 210 of the present embodiment, the annular groove 46 that functions as the cable reel is formed on one wheel half body 217a of the steering wheel 211, and the cable 47 is arranged within the annular groove 46 such that the cable 47 has a sufficient extra length. In the case of the present embodiment, it is possible to relatively easily perform a maintenance work such as a replacement of the cable 47.

Fourth Embodiment

Figure 12:
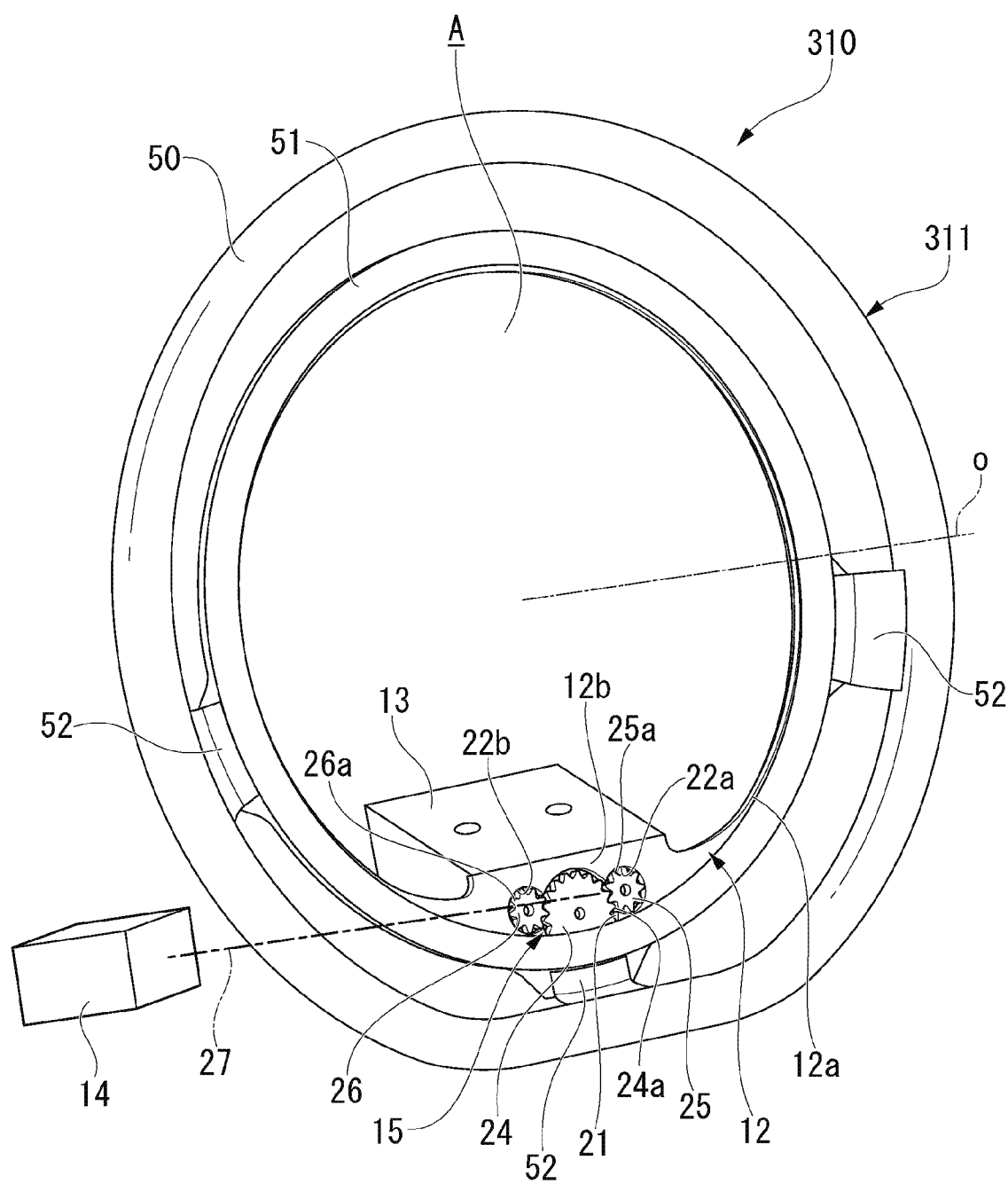
FIG. 12 is a perspective view of a main part of a steering apparatus of a fourth embodiment.
Figure 13:
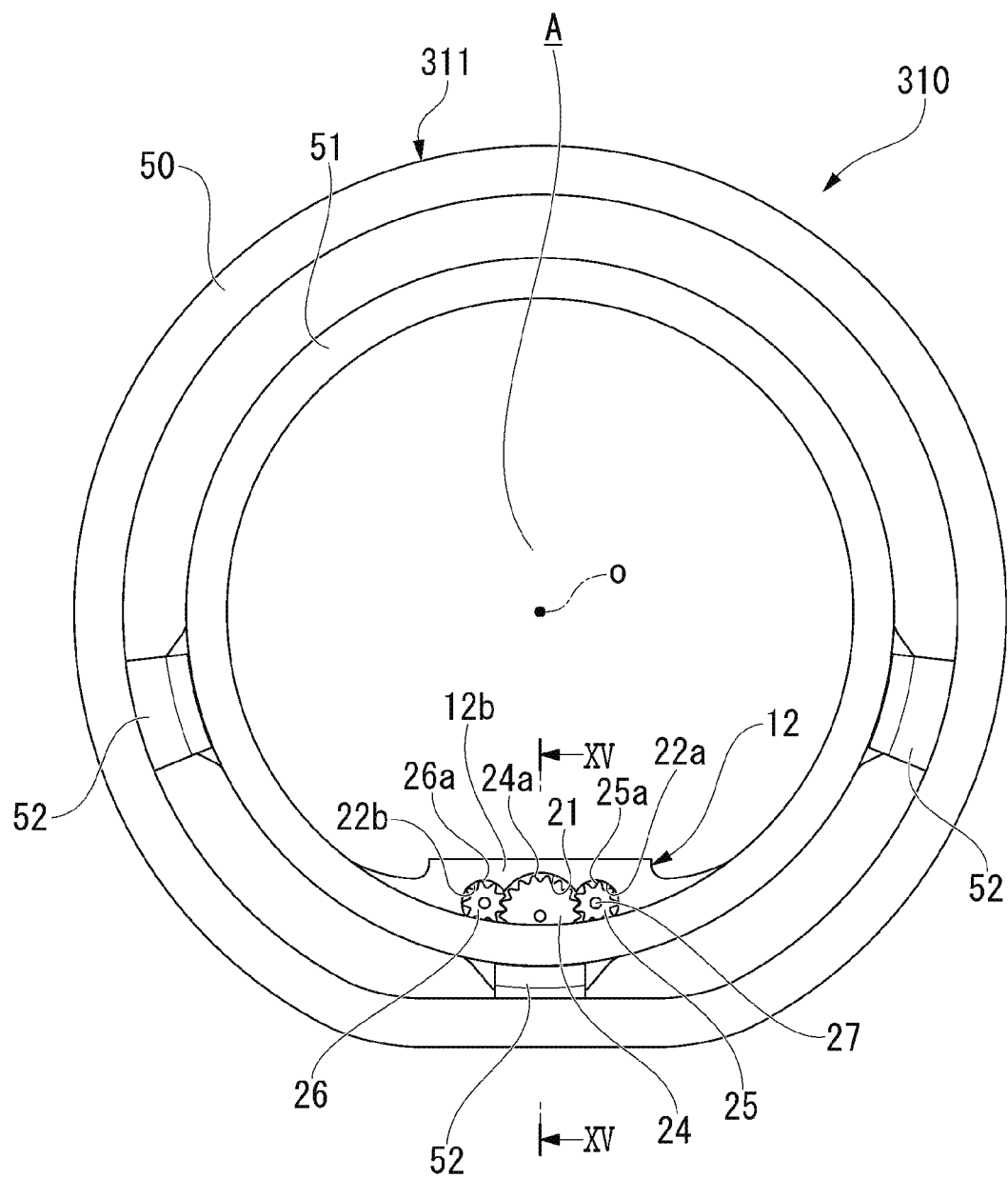
FIG. 13 is a front view of the main part of the steering apparatus of the fourth embodiment.
Figure 14:
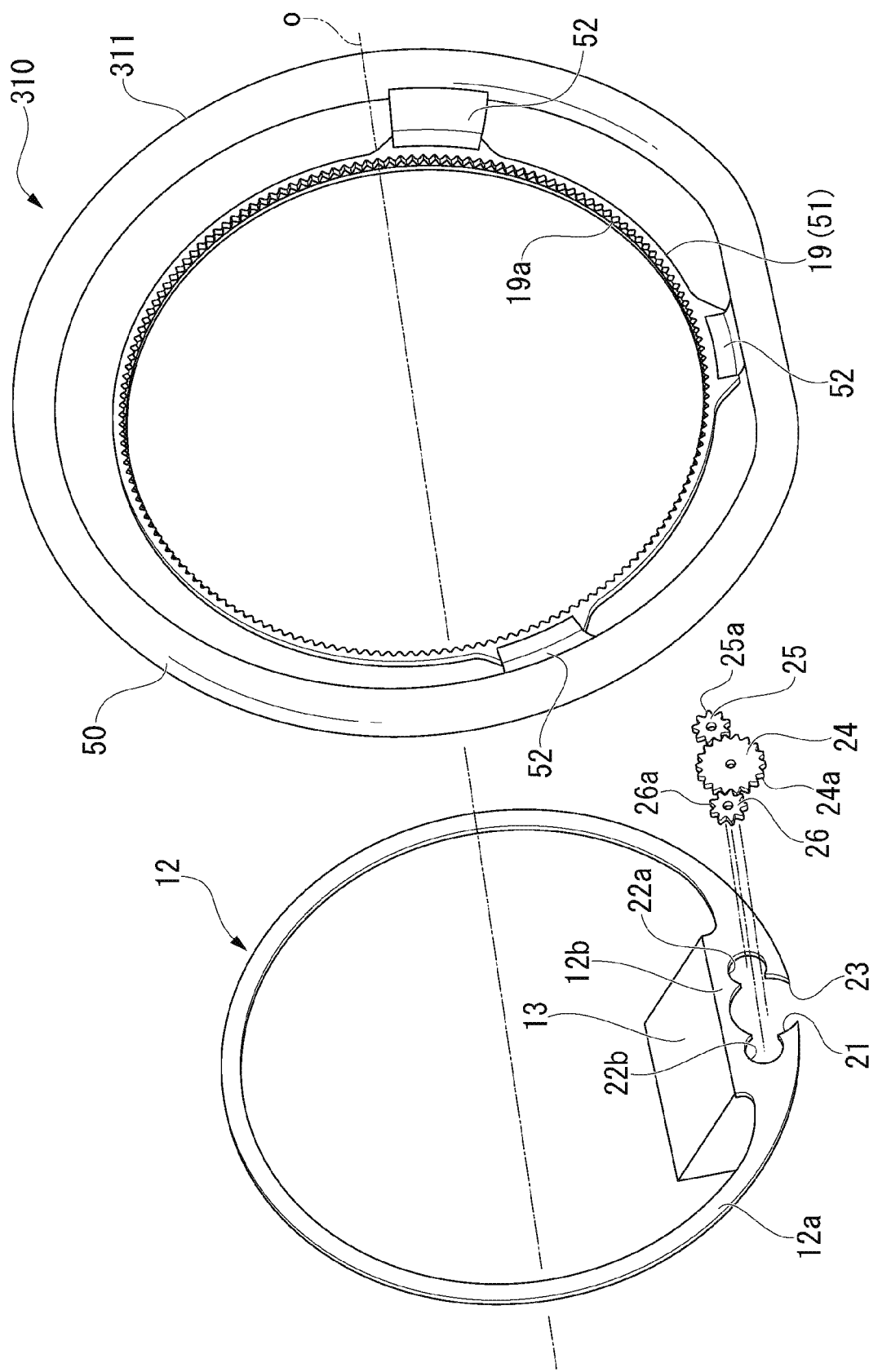
FIG. 14 is an exploded perspective view of the main part of the steering apparatus of the fourth embodiment.

FIG. 12 is a perspective view of a main part of a steering apparatus 310. FIG. 13 is a front view of the main part of the steering apparatus 310. FIG. 14 is an exploded perspective view of the main part of the steering apparatus 310.

In the steering apparatus 310 of the present embodiment, a basic configuration is substantially similar to that of the first embodiment, but a structure of a steering wheel 311 is different from that of the first embodiment. The steering wheel 311 of the present embodiment includes a main wheel 50 having a large diameter and gripped by the driver and a supplement wheel 51 that has a small diameter, is arranged on an inner circumferential side of the main wheel 50, and is rotated integrally with the main wheel 50. The main wheel 50 and the supplement wheel 51 are formed in a substantially annular shape and are connected together via a plurality of connection pieces 52. The supplement wheel 51 is arranged coaxially with the main wheel 50 at a position that is offset frontward with respect to the main wheel 50. Although not shown, a hazard switch, an operation switch of a navigation device, and the like can be provided on the supplement wheel 51 that is not directly gripped by the driver.

Figure 15:
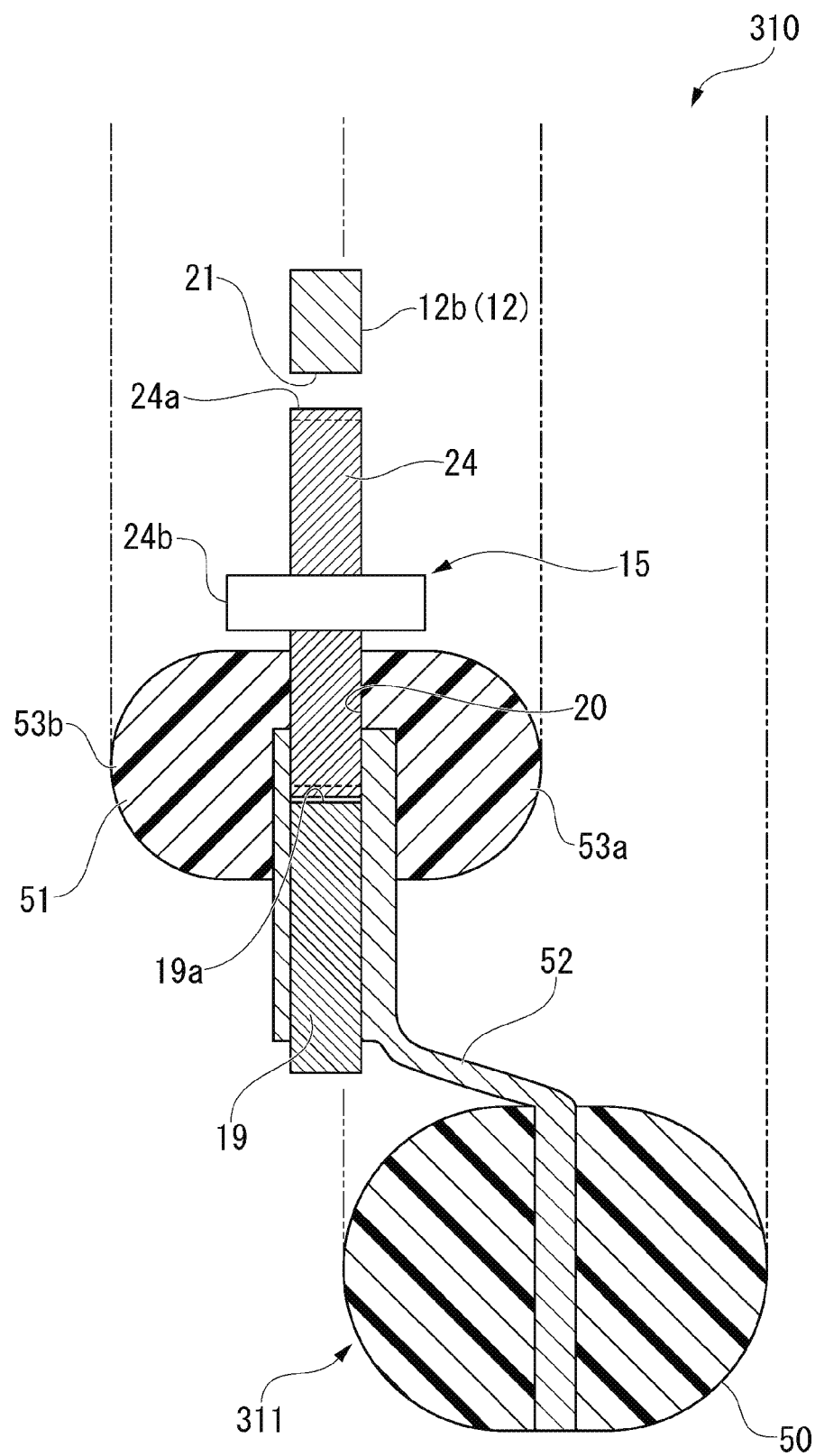
FIG. 15 is a cross-sectional view along a XV-XV line of FIG. 13 of the steering apparatus of the fourth embodiment.
Figure 16:
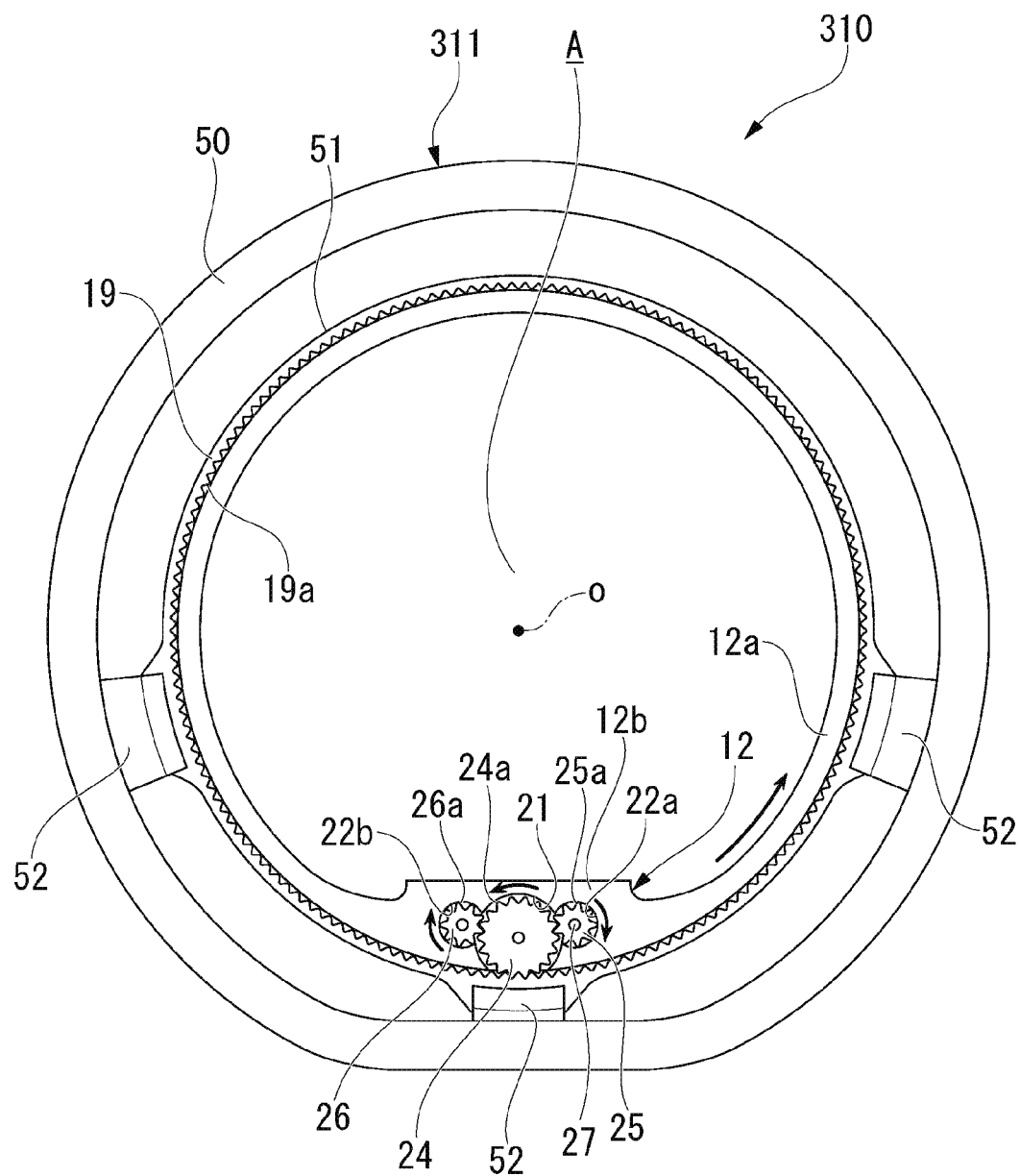
FIG. 16 is a view showing an operation of the main part of the steering apparatus according to the fourth embodiment.

FIG. 15 is a cross-sectional view along a XV-XV line of FIG. 13. The scale of the cross-section of FIG. 15 is appropriately adjusted. FIG. 16 is a view showing an operation of the main part of the steering apparatus 310. In FIG. 16, part of components (a supplement wheel half body 53a which will be described later) is removed from the front view of the main part of FIG. 13.

The supplement wheel 51 is obtained by joining two supplement wheel half bodies 53a, 53b having a substantially annular shape together. A ring gear 19 is sandwiched between the two supplement wheel half bodies 53a, 53b. The ring gear 19 is fixed to an outer circumferential edge part of the two supplement wheel half bodies 53a, 53b and forms an annular opening part 20 between the ring gear 19 and an inner circumferential edge part of the supplement wheel half bodies 53a, 53b. A ring part 12a of the support frame 12 is accommodated inside the opening part 20.

The ring part 12a slidably holds the supplement wheel 51. The supplement wheel 51 and the main wheel 50 are supported by the support frame 12 rotatably around a rotation center axis line o.

The support frame 12 has a structure similar to that of the first embodiment. The support frame 12 includes the ring part 12a described above and a protrusion piece 12b (protrusion part), and the first gear 24, the second gear 25, and the third gear 26 are held in an area spanning the protrusion piece 12b (protrusion part) and the ring part 12a. The first gear 24 is engaged with the internal tooth 19a of the ring gear 19, and the output shaft 27 is connected to the second gear 25. When the main wheel 50 is operated and rotated by the driver, the ring gear 19 of the supplement wheel 51 is rotated together with the main wheel 50 as indicated by an arrow in FIG. 16. When the ring gear 19 is rotated in this way, the rotation is transmitted to the output shaft 27 via the first gear 24 and the second gear 25.

In the case of the present embodiment, the support frame 12 and the fixation stay 13 (frame fixation part) are arranged to be offset with respect to the rotation center axis line o. Although not shown, the airbag unit 16 (refer to FIG. 1) similar to that of the first embodiment is attached to the fixation stay 13. The airbag unit 16 is arranged to be offset downward relative to the rotation center axis line o. Accordingly, in the case of the present embodiment, a large access area A that includes a part through which the rotation center axis line o passes is ensured at an inner circumferential side of the steering wheel 311 (supplement wheel 51).

Since the basic configuration of the steering apparatus 310 of the present embodiment is substantially similar to that of the first embodiment, it is possible to obtain an advantage similar to that of the first embodiment.

However, in the steering apparatus 310 of the present embodiment, the supplement wheel 51 that is not gripped by the driver at an ordinary time is rotatably supported by the support frame 12. Therefore, even in a case where the steering wheel 11 is operated and rotated to a position across the protrusion piece 12b of the support frame 12 while keeping a state where the driver grips the main wheel 50, a finger of the driver who grips the main wheel 50 does not come into contact with the protrusion piece 12b. Accordingly, in the steering apparatus 310 of the present embodiment, there is an advantage that the rotation operation of the driver who grips the steering wheel 11 becomes easy.

Fifth Embodiment

Figure 17:
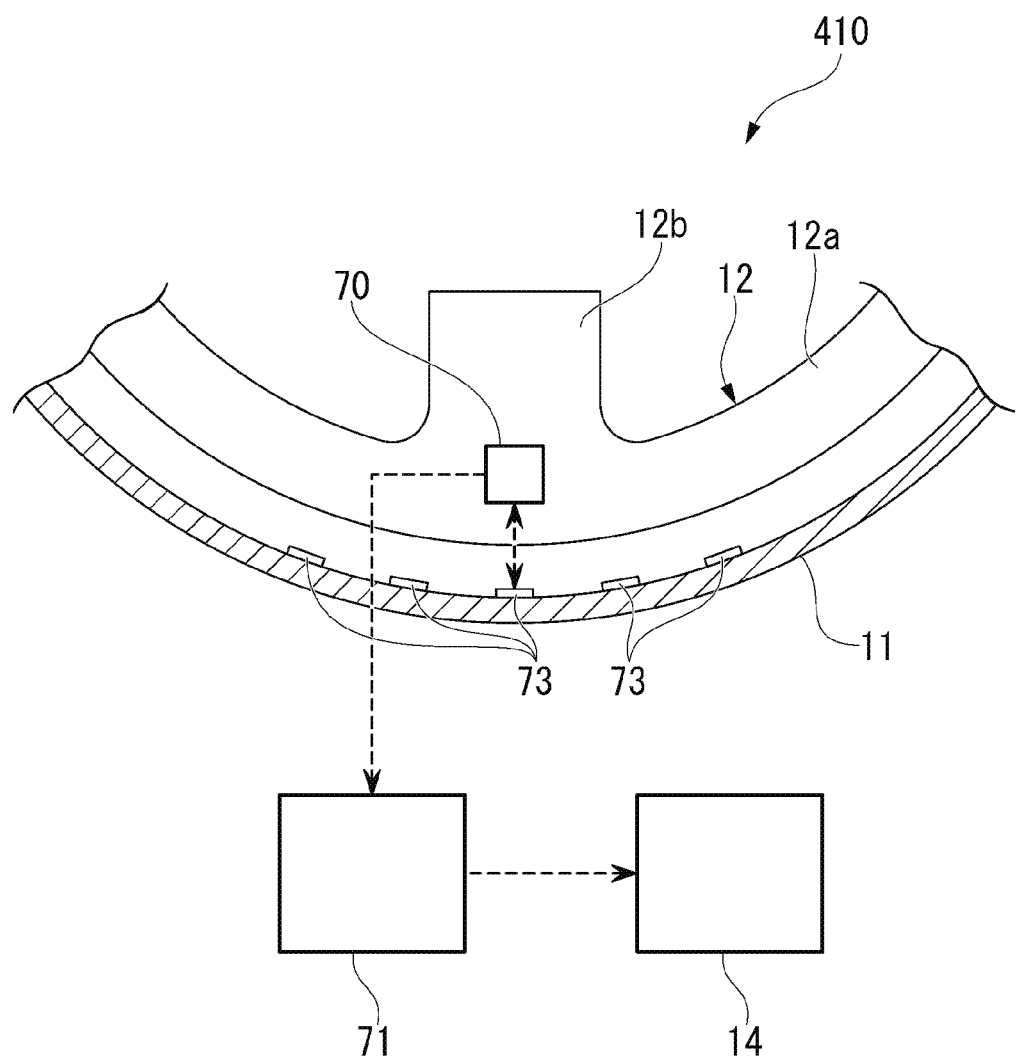
FIG. 17 is a schematic configuration view of a steering apparatus according to a fifth embodiment.

FIG. 17 is a schematic configuration view of a steering apparatus 410 according to a fifth embodiment.

In the embodiments described above, the steering transmission part that transmits the rotation of the steering wheel to the steering mechanism of the wheel is constituted of the mechanical operation transmission mechanism. However, in the steering apparatus 410 of the present embodiment, the steering transmission part includes a steering detection section 70 that detects rotation information of the steering wheel 11 and a steering actuator 71 such as a motor that operates the steering mechanism 14 on the basis of the information detected by the steering detection part 70. In the case of the present embodiment, a fixation stay (frame fixation part) and the support frame 12 that rotatably supports the steering wheel 11 are arranged at a position that does not overlap with a rotation center axis line of the steering wheel 11 in a front view of the steering wheel 11.

The steering detection section 70 can be constituted of, for example, an information reading device such as a sensor or a camera provided on the support frame 12 and a detection target provided on an inner circumferential surface of the steering wheel 11. The information read by the steering detection section 70 is input to a control apparatus (not shown), and the control apparatus controls the steering actuator 71 in accordance with steering information. The configuration of the steering detection section 70 is not limited to the above-described one, and it is possible to employ various types of devices such as a capacitance-type device, a device using a QR code (registered trademark), or a device using a bar code as long as the device can detect a rotation direction, a rotation position, an operation speed, and the like of the steering wheel 11 as an electric signal.

The steering apparatus 410 of the present embodiment has a configuration in which the steering information of the steering wheel 11 is detected by the steering detection section 70, and the steering actuator 71 is controlled on the basis of the detected information. Therefore, it is possible to enhance the degree of freedom of the arrangement of configuration components compared to a case where an operation force of the steering wheel 11 is transmitted to the steering mechanism 14 via the mechanical operation transmission mechanism. Accordingly, when the configuration of the present embodiment is employed, there is an advantage from the viewpoint of a component layout of the vehicle.

The present invention is not limited to the embodiments described above, and various design changes can be made without departing from the scope of the invention.

What is claimed is:

1. A steering apparatus, comprising:
   a steering wheel that has a substantially annular shape and that is operated and rotated by a driver;
   a support frame that rotatably supports the steering wheel;
   a frame fixation part that fixes the support frame to a vehicle body; and
   a steering transmission part that transmits a rotation of the steering wheel relative to the support frame to a steering mechanism of a wheel,
   wherein the support frame and the frame fixation part are arranged at a position that does not overlap with a rotation center axis line of the steering wheel in a front view of the steering wheel, and
   wherein the steering apparatus further comprises: a cover material that covers a circumference of a grip part of the steering wheel and is deformable in a deflection manner,
   the support frame has a protrusion part that protrudes toward an inner circumferential side from the steering wheel,
   an opening part that accepts displacement of the protrusion part accompanied by a rotation operation is formed on the steering wheel,
   the cover material forms a lid part that closes the opening part, and
   the opening part appears in a case where the lid part is deformed in a deflection manner by the protrusion part.

2. The steering apparatus according to claim 1, wherein an area that includes a part, through which the rotation center axis line of the steering wheel passes, on an inner circumferential side of the steering wheel is an access area through which an instrument panel of a vehicle is visible and operable.

3. The steering apparatus according to claim 1, wherein the steering transmission part is constituted of a mechanical operation transmission mechanism arranged at a position that is offset from the rotation center axis line of the steering wheel.

4. The steering apparatus according to claim 3, wherein the operation transmission mechanism includes:
   a ring gear that is rotated integrally with the steering wheel; and
   a power transmission gear that is rotatably supported by the support frame and that is engaged with a tooth surface of the ring gear and transmits a rotation of the ring gear to the steering mechanism.

5. The steering apparatus according to claim 1, wherein the steering transmission part includes a steering detection part that detects rotation information of the steering wheel relative to the support frame and a steering actuator that operates the steering mechanism according to the information detected by the steering detection part.

6. The steering apparatus according to claim 1, wherein the lid part is biased by a biasing member in a direction in which the opening part is closed.

7. The steering apparatus according to claim 1, wherein the steering wheel comprises:
   a main wheel gripped by the driver; and
   a supplement wheel that is arranged on an inner circumferential side of the main wheel, is rotated integrally with the main wheel, and is rotatably supported by the support frame.

8. The steering apparatus according to claim 1, wherein an instrument is provided on a surface that faces a driver's seat side of the steering wheel.

* * * * *